(12) United States Patent
Dhaka et al.

(10) Patent No.: US 12,356,367 B2
(45) Date of Patent: Jul. 8, 2025

(54) SYSTEM AND METHOD FOR IDENTIFICATION OF INDOOR-SMALL-CELL LOCATIONS

(71) Applicant: RAKUTEN SYMPHONY, INC., Tokyo (JP)

(72) Inventors: Prithvi Raj Dhaka, Indore (IN); Nimit Agrawal, Indore (IN)

(73) Assignee: RAKUTEN SYMPHONY, INC., Tokyo (JP)

( * ) Notice: Subject to any disclaimer, the term of this patent is extended or adjusted under 35 U.S.C. 154(b) by 0 days.

(21) Appl. No.: 17/905,332

(22) PCT Filed: Jul. 6, 2022

(86) PCT No.: PCT/US2022/036167
§ 371 (c)(1),
(2) Date: Aug. 31, 2022

(87) PCT Pub. No.: WO2024/010572
PCT Pub. Date: Jan. 11, 2024

(65) Prior Publication Data
US 2024/0259990 A1    Aug. 1, 2024

(51) Int. Cl.
*H04M 15/00* (2024.01)
*H04W 24/08* (2009.01)
*H04W 64/00* (2009.01)

(52) U.S. Cl.
CPC ......... *H04W 64/006* (2013.01); *H04W 24/08* (2013.01)

(58) Field of Classification Search
CPC ... H04W 64/006; H04W 24/08; H04W 24/10; H04W 24/02
USPC .......................................................... 455/405
See application file for complete search history.

(56) References Cited

U.S. PATENT DOCUMENTS 10,477,426 B1 * 11/2019 Tiwari ................ H04L 43/0852

FOREIGN PATENT DOCUMENTS

CN           112423335 A  *  2/2021

* cited by examiner

*Primary Examiner* — Tanmay K Shah
(74) *Attorney, Agent, or Firm* — HAUPTMAN HAM, LLP

(57) ABSTRACT

In some embodiments, a method includes determining whether a network serving cell serving a building is highly utilized; and determining an amount of users of the network serving cell that are included in the building per twenty-four-hour period.

20 Claims, 6 Drawing Sheets

SYSTEM AND METHOD FOR IDENTIFICATION OF INDOOR-SMALL-CELL LOCATIONS

RELATED APPLICATIONS

The present application is a National Phase of International Application No. PCT/US2022/036167, filed Jul. 6, 2022.

TECHNICAL FIELD

This description relates to an identification of indoor small cell locations system and method of using the same.

BACKGROUND

A cellular network is a telecommunication system of mobile devices (e.g., mobile phone devices) that communicate by radio waves through a local antenna at a cellular base station (e.g., cell tower). The coverage area in which service is provided is divided into small geographical areas called "cells". Each cell is served by a separate low power multichannel transceiver and antenna at the cell tower. Mobile devices within a cell communicate through that cell's antenna on multiple frequencies and on separate frequency channels assigned by the base station from a common pool of frequencies used by the cellular network.

A radio access network (RAN) is part of the telecommunication system and implements radio access technology. RANs reside between a device such as a mobile phone, a computer, or remotely controlled machine and provides connection with a core network (CN). Depending on the standard, mobile phones and other wireless connected devices are varyingly known as user equipment (UE), terminal equipment, mobile station (MS), and the like.

SUMMARY

In some embodiments, a method includes determining whether a network serving cell serving a building is highly utilized; and determining an amount of users of the network serving cell that are included in the building per twenty-four-hour period.

In some embodiments, an apparatus includes a processor; and a memory having instructions stored thereon that, when executed by the processor, cause the apparatus to determine whether a network serving cell serving a building is highly utilized; and determine an amount of users of the network serving cell that are included in the building per twenty-four-hour period.

In some embodiments, a non-transitory computer readable medium having instructions stored thereon that, when executed by a processor, cause an apparatus to determine whether a network serving cell serving a building is highly utilized; determine an amount of users of the network serving cell that are included in the building per twenty-four-hour period; in response to the amount of users of the network serving cell that are included in the building per twenty-four-hour period being greater than one hundred, identify the building as a priority one building; in response to the amount of users of the network serving cell that are included in the building per the twenty-four-hour period being equal to or greater than sixty but less than one hundred, identify the building as a priority two building; in response to the amount of users of the network serving cell that are included in the building per the twenty-four-hour period being equal to or greater than twenty but less than sixty, identify the building as a priority three building; and in response to the network serving cell serving the building not being highly utilized, determining whether the building is uncovered by a signal band with a reference signal received power (RSRP) of equal to or greater than a first threshold for greater than a second threshold of the building.

BRIEF DESCRIPTION OF THE DRAWINGS

Aspects of the present disclosure are best understood from the following detailed description when read with the accompanying FIGS. In accordance with the standard practice in the industry, various features are not drawn to scale. In some embodiments, dimensions of the various features are arbitrarily increased or reduced for clarity of discussion.

DETAILED DESCRIPTION

Figure 1:
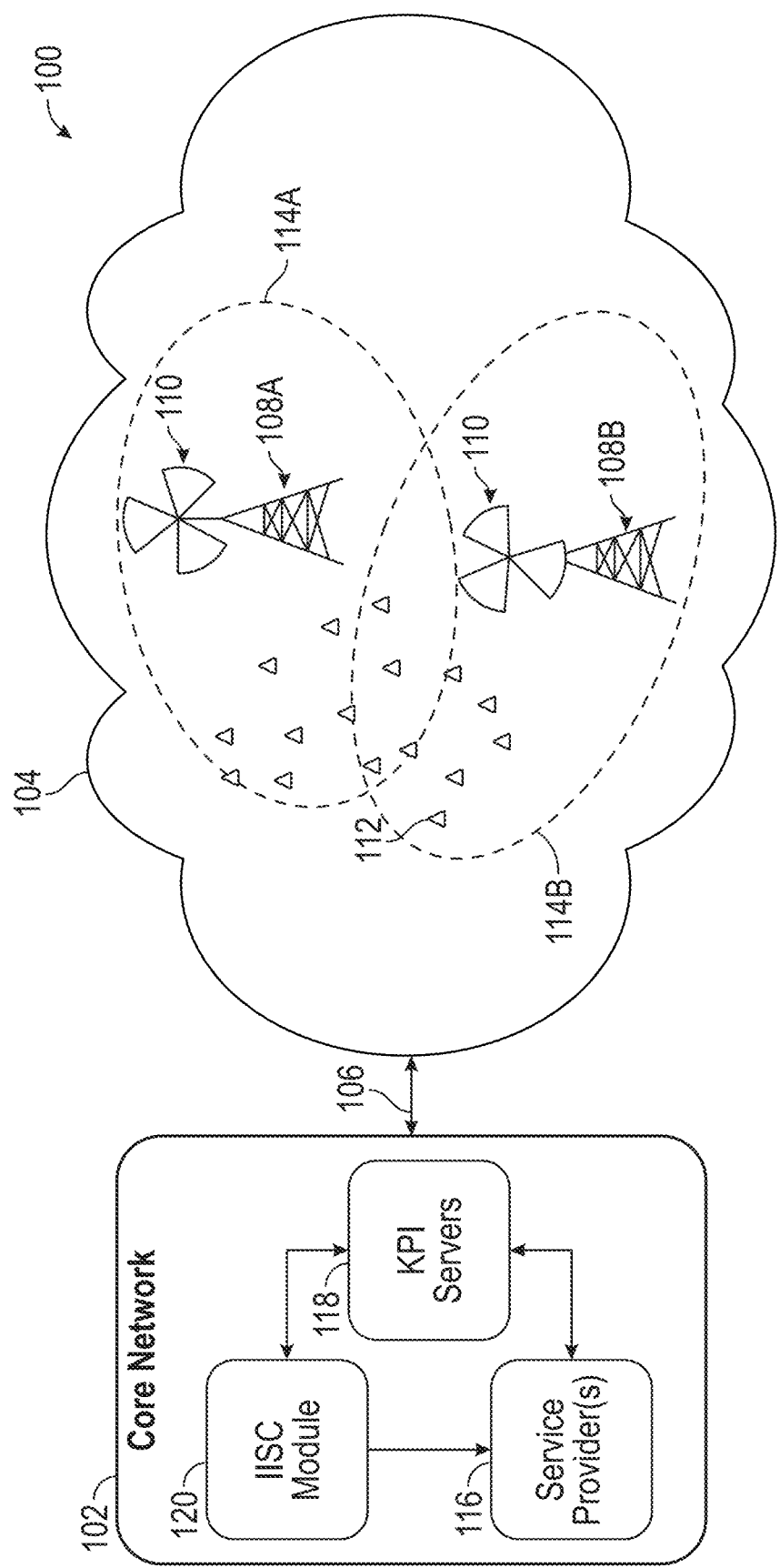
FIG. 1 is a diagrammatic representation of a system for identification of internal building locations for indoor small cells (IISC), in accordance with some embodiments.

The following disclosure provides many different embodiments, or examples, for implementing distinctive features of the provided subject matter. Examples of components, values, operations, materials, arrangements, or the like, are described below to simplify the present disclosure. These are, of course, examples and are not intended to be limiting. Other components, values, operations, materials, arrangements, or the like, are contemplated. For example, the formation of a first feature over or on a second feature in the description that follows include embodiments in which the first and second features are formed in direct contact, and further include embodiments in which additional features are formed between the first and second features, such that the first and second features are unable to be in direct contact. In addition, the present disclosure repeats reference numerals and/or letters in the numerous examples. This repetition is for the purpose of simplicity and clarity and does not in itself dictate a relationship between the various embodiments and/or configurations discussed.

Further, spatially relative terms, such as "beneath," "below," "lower," "above," "upper" and the like, are used herein for ease of description to describe one element or feature's relationship to another element or feature as illustrated in the FIGS. The spatially relative terms are intended to encompass different orientations of the device in use or operation in addition to the orientation depicted in the FIGS. The apparatus is otherwise oriented (rotated 90 degrees or at other orientations) and the spatially relative descriptors used herein likewise are interpreted accordingly.

In some embodiments, identification, and feasibility, of internal building locations for indoor small cells (IISCs) is discussed. Currently, a readily available solution which pinpoints the location of buildings where indoor small cells (IDSCs) are feasible is non-existent. In some embodiments, an IISCs report prioritizes buildings for deployment of internal building solutions such as Wi-Fi (a family of wireless network protocols, based on the IEEE 802.11 family of standards incorporated in entirety by reference, which are commonly used for local area networking of devices and Internet access, allowing nearby digital devices to exchange data by radio waves), LTE (long-term evolution is a standard for wireless broadband communication for mobile devices and data terminals) small cell (are low-powered cellular radio access nodes that operate in licensed and unlicensed spectrum that have a range of 10 meters to a few kilometers), and FTTx (fiber to the x or fiber in the loop is a generic term for any broadband network architecture using optical fiber to provide a local loop used for last mile telecommunications) solutions and the same helps to decongest the existing network as well as increasing the coverage footprint.

In some embodiments, a cost saving solution is discussed as a need to send engineers into the field to survey each individual building becomes obsolete. In some embodiments, an IISCs algorithm is configured to use crowd-sourced data (allows researchers to cheaply outsource simple tasks or questionnaires, gather data in real time, and obtain far more numerous and widespread observations than in traditional data collection given its relatively low cost) and building layer (a composite layer that organizes building information modeling (BIM) file workspace by datasets (disciplines including architectural, structural, piping, mechanical, and electrical), and each dataset is composed of a layer that represents the BIM file multi-patch feature class) to identify potential buildings for internal building solutions. Once the IISCs algorithm output is generated then potential buildings are verified through field and solution deployment.

In some embodiments, an IISCs planning module is discussed. In some embodiments, an IISCs report prioritizes buildings for deployment of internal building solutions such as Wi-Fi solutions, LTE small cell solutions, and/or FTTx solutions. In some embodiments, the IISCs Report is a comprehensive report that summarizes factors that influence the prioritization of the buildings for indoor solution deployment. In some embodiments, prioritization of buildings includes priority levels (e.g., P1, P2, P3, and P4) based on coverage and capacity checks.

In some embodiments, macro (macrocell is used to describe the widest range of cell sizes typically found in rural areas or along highways and used in a densely populated urban area) planned sites within 150-meter radius of a building are identified, for prioritizing delivery.

In some embodiments, a correlation engine (a correlation engine is a software application that programmatically understands relationships) for building prioritization is disclosed. In some embodiments, to execute a coverage check for each corresponding band, IISC planning module calculates whether the building includes at least one wall coverage (e.g., at least one wall of the building) with a threshold of reference signal received power (RSRP) ≥−100 dBm in ≥95% of the building polygon. RSRP is an acronym for reference signal received power which is a measurement of the received power level in an LTE cell network. The average power is a measurement of the power received from a single reference signal. RSRP is the power of the LTE reference signals spread over the full bandwidth and narrow band. In some embodiments, the file data is in a specific file format (e.g., grid type patterns).

In some embodiments, a capacity check for each corresponding band is performed where IISCs planning module identifies the serving cells, and whether the serving cells are high usage serving cells that require offloading of users/subscribers.

In some embodiments, a planned macro site or small cells in the building vicinity are identified. In some embodiments, planned macro sites within a 200-meter radius and outdoor small cells within a 50-meter radius of a building are identified to either prioritize the building for the indoor solution deployment or to expedite the identified planned sites.

FIG. 1 is a diagrammatic representation of a system for identification of internal building locations for indoor small cells (IISCs) 100, in accordance with some embodiments.

IISCs system 100 includes a CN 102 communicatively connected to RAN 104 through backhaul 106, which is communicatively connected to base stations 108A and 108B (hereinafter base station 108), with antennas 110 that are wirelessly connected to UEs 112 located in geographic coverage cells 114A and 114B (hereinafter geographic coverage cells 114). CN 102 includes one or more service provider(s) 116, KPI servers 118, and IISC module 120.

CN 102 (further known as a backbone) is a part of a computer network which interconnects networks, providing a path for the exchange of information between different local area networks (LANs) or subnetworks. In some embodiments, CN 102 ties together diverse networks over wide geographic areas, in different buildings in a campus environment, or in the same building.

In some embodiments, RAN 104 is a global system for mobile communications (GSM) RAN, a GSM/EDGE RAN, a universal mobile telecommunications system (UMTS) RAN (UTRAN), an evolved UMTS terrestrial radio access network (E-UTRAN), open RAN (O-RAN), or cloud-RAN (C-RAN). RAN 104 resides between user equipment 112 (e.g., mobile phone, a computer, or any remotely controlled machine) and CN 102. In some embodiments, RAN 104 is a C-RAN for purposes of simplified representation and discussion. In some embodiments, base band units (BBU) replace the C-RAN.

In conventional distributed cellular networks, equipment at the bottom and top of a base station of a cell site is the BBU. The BBU is radio equipment that links UEs to the CN and processes billions of bits of information per hour. The BBU was traditionally placed in an enclosure or shelter situated at the bottom of a base station. C-RAN, in contrast, uses fiber optic's large signal-carrying capacity to centralize numerous BBUs at a dedicated pool location or a base station. This reduces the quantity of equipment at base stations and provides many other advantages, including lower latency.

In a hierarchical telecommunications network, backhaul portion 106 of IISC system 100 includes the intermediate link(s) between CN 102 and RAN 104. The two main methods of mobile backhaul implementations are fiber-based backhaul and wireless point-to-point backhaul. Other methods, such as copper-based wireline, satellite communications and point-to-multipoint wireless technologies are being phased out as capacity and latency requirements become higher in 4G and 5G networks. Backhaul refers to the side of the network that communicates with the Internet. The connection between base station 108 and UE 112 begins with backhaul 106 connected to CN 102. In some embodiments, backhaul 106 includes wired, fiber optic, and wireless components. Wireless sections include using microwave bands, mesh, and edge network topologies that use a high-capacity wireless channels to get packets to the microwave or fiber links.

In some embodiments, base stations 108 are lattice or self-supported towers, guyed towers, monopole towers, and concealed towers (e.g., towers designed to resemble trees, cacti, water towers, signs, light standards, and other types of structures). In some embodiments, base stations 108 are a cellular-enabled mobile device site where antennas and electronic communications equipment are placed, typically on a radio mast, tower, or other raised structure to create a cell (or adjacent cells) in a network. The raised structure typically supports antenna(s) 110 and one or more sets of transmitter/receivers (transceivers), digital signal processors, control electronics, a remote radio head (RRH), primary and backup electrical power sources, and sheltering. Base stations are known by other names such as base transceiver station, mobile phone mast, or cell tower. In some embodiments, base stations are replaced with other edge devices configured to wirelessly communicate with UEs. The edge device provides an entry point into service provider CNs, such as CN 102. Examples include routers, routing switches, integrated access devices (IADs), multiplexers, and a variety of metropolitan area network (MAN) and wide area network (WAN) access devices.

In at least one embodiment, antenna(s) 110 are a sector antenna. In some embodiments, antenna(s) 110 are a type of directional microwave antenna with a sector-shaped radiation pattern. In some embodiments, the sector degrees of arc are 60°, 90°, or 120° designs with a few degrees extra to ensure overlap. Further, sector antennas are mounted in multiples when wider coverage or a full-circle coverage is desired. In some embodiments, antenna(s) 110 are a rectangular antenna, sometimes called a panel antenna or radio antenna, used to transmit and receive waves or data between mobile devices or other devices and a base station. In some embodiments, antenna(s) 110 are circular antennas. In some embodiments, antenna 110 operates at microwave or ultra-high frequency (UHF) frequencies (300 MHz to 3 GHz). In other examples, antenna(s) 110 are chosen for their size and directional properties. In some embodiments, the antenna(s) 110 are MIMO (multiple-input, multiple-output) antennas that send and receive greater than one data signal simultaneously over the same radio channel by exploiting multipath propagation.

In some embodiments, UEs 112 are a computer or computing system. Additionally, or alternatively, UEs 112 have a liquid crystal display (LCD), light-emitting diode (LED) or organic light-emitting diode (OLED) screen interface, such as user interface (UI) 622 (FIG. 6), providing a touchscreen interface with digital buttons and keyboard or physical buttons along with a physical keyboard. In some embodiments, UE 112 connects to the Internet and interconnects with other devices. Additionally, or alternatively, UE 112 incorporates integrated cameras, the ability to place and receive voice and video telephone calls, video games, and Global Positioning System (GPS) capabilities. Additionally, or alternatively, UEs run operating systems (OS) that allow third-party apps specialized for capabilities to be installed and run. In some embodiments, UEs 112 are a computer (such as a tablet computer, netbook, digital media player, digital assistant, graphing calculator, handheld game console, handheld personal computer (PC), laptop, mobile Internet device (MID), personal digital assistant (PDA), pocket calculator, portable medial player, or ultra-mobile PC), a mobile phone (such as a camera phone, feature phone, smartphone, or phablet), a digital camera (such as a digital camcorder, or digital still camera (DSC), digital video camera (DVC), or front-facing camera), a pager, a personal navigation device (PND), a wearable computer (such as a calculator watch, smartwatch, head-mounted display, earphones, or biometric device), or a smart card.

In at least one embodiment, geographic coverage cells 114 include a shape and size. In some embodiments, geographic coverage cells 114 are a macro-cell (covering 1 Km-30 Km), a micro-cell (covering 200 m-2 Km), or a pico-cell (covering 4 m-200 m). In some embodiments, geographic coverage cells are circular, oval (FIG. 1), sector, or lobed in shape, but geographic coverage cells 114 are configured in most any shape or size. Geographic coverage cells 114 represent the geographic area antenna 110 and UEs 112 are configured to communicate. Coverage depends on several factors, such as orography (i.e., mountains) and buildings, technology, radio frequency and for two-way telecommunications the sensitivity and transmit efficiency of UE 112. Some frequencies provide better regional coverage, while other frequencies penetrate better through obstacles, such as buildings in cities. The ability of a UE to connect to a base station depends on the strength of the signal.

Service provider(s) 116 are businesses, vendors, or organizations that sell bandwidth or network access by providing direct Internet backbone access to Internet service providers and usually access to network access points (NAPs). Service providers are sometimes referred to as backbone providers, Internet providers, or vendors. Service providers consist of telecommunications companies, data carriers, wireless communications providers, Internet service providers, and cable television operators offering high-speed Internet access.

KPI servers 118 produce both predictions and live network data. Live-network data (KPIs, UE/cell/MDT (minimization of drive test) traces, and crowdsourced data) allows for modelling of network traffic, hot-spot identification, and radio signal propagation. RF drive testing is a method of measuring and assessing the coverage, capacity, and Quality of Service (QoS) of a mobile radio network, such as RAN 104. The technique consists of using a motor vehicle containing mobile radio network air interface measurement equipment that detects and records a wide variety of the physical and virtual parameters of mobile cellular service in each geographical area. By measuring what a wireless network subscriber experiences in an area, wireless carriers make directed changes to networks that provide better coverage and service to customers. Drive testing commonly is configured with a mobile vehicle outfitted with drive testing measurement equipment. The equipment is usually highly specialized electronic devices that interface to original equipment manufacturer (OEM) mobile handsets (UEs). This ensures measurements are realistic and comparable to actual user experiences. For mobile networks, crowdsourcing methodology leverages a crowd of participants (e.g., the mobile subscribers) to gather network measurements, either manually or automatically through mobile apps, or directly from the network using call traces.

UE/cell/MDT traces collected at the operations support systems (OSS) or through dedicated tools provide service provider(s) 116 with user-level information. Once geo-located, UE/cell/MDT traces are used to enhance path-loss calculations and prediction plots, as well as to identify and locate problem areas and traffic hotspots. KPI servers 118 allow service provider(s) 116 to use UE/cell/MDT traces along with IISC module 120 for network optimization.

Figure 6:
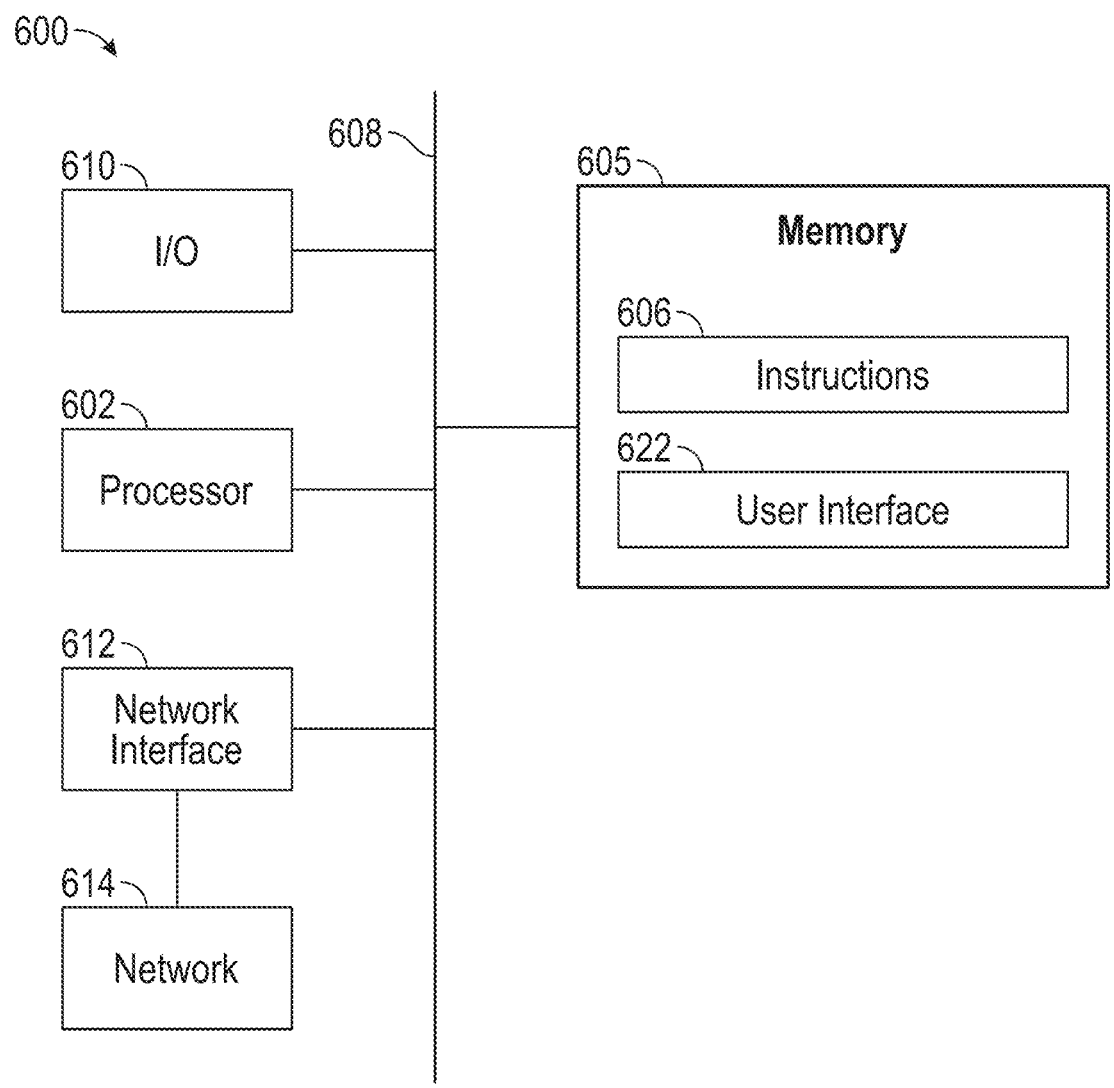
FIG. 6 is a high-level functional block diagram of a processor-based system, in accordance with some embodiments.

In some embodiments, IISC module 120 prioritizes buildings for deployment of internal building solutions such as Wi-Fi solutions, LTE small cell solutions, or FTTx solutions. In some embodiments, IISC module 120 gathers geo-located sample data. In some embodiments, this geo-located data is provided by KPI servers 118. In some embodiments, the geo-located sample data is provided by a database or memory, such as memory 805 (FIG. 6). In some embodiments, the geo-located data includes serving ENodeB ID (i.e., the identifier of the node at the base station). In some embodiments, the geo-located data is provided and/or collected through drive testing, UE KPIs reported by the UE, such as UEs 112, base station KPI reporting through central units (CU) or distribution units (DU) associated with a base station, such as base stations 108, or other suitable methods of collecting geo-located data in accordance with some embodiments.

In some embodiments, IISC module 120 gathers new radio evolved absolute radio-frequency channel number (NR EARFCN). An absolute radio-frequency channel number (ARFCN) is a code that specifies a pair of reference frequencies used for transmission and reception in radio system. In a frequency division duplex (FDD) system one ARFCN number is used for downlink and another for uplink as downlink and uplink frequencies are different. In a time division duplex (TDD) system one ARFCN number is used as downlink and uplink frequency remains the same. The term ARFCN originated with GSM and evolved with the recent technologies. For example, UARFCN for UMTS/WCDMA, EARFCN for E-UTAR/LTE and NR-ARFCN for 5G/New Radio. NR-ARFCNs for 5G new radio are defined in 3GPP specification 38.101-1 and 38.101-2, both of which are incorporated by reference in entirety.

In some embodiments, IISC module 120 gathers the physical cell ID (PCI). PCI used to indicate the physical layer identity of a cell. The PCI is used for cell identity during the cell selection procedure. The purpose of PCI optimization is to ensure to a great extent that neighboring cells have different primary sequences allocated. Good PCI assignment reduces call drops by enabling UEs to clearly distinguish one cell from another.

In some embodiments, IISC module 120 gathers the latitude and longitude of the node (e.g., eNB) or base station 108. In some embodiments, IISC module 120 gathers the RSRP. RSRP is an acronym for reference signal received power which is a measurement of the received power level in an LTE cell network. The average power is a measurement of the power received from a single reference signal. RSRP is the power of the LTE reference signals spread over the full bandwidth and narrow band. In some embodiments, the file data is in a specific file format (e.g., grid type patterns). In some embodiments, the RSRP is obtained from KPI servers 118.

In some embodiments, IISC module 120 gathers the reference signal received quality (RSRQ). RSRQ is used in 5G new radio (NR) networks to determine the quality of the radio channel. RSRQ, unlike RSRP (desired signal strength), further includes interference level due to the inclusion of received signal strength indicator (RSSI) in the calculation. RSRQ is further used for cell selection and handover, in response to the RSRP being insufficient RSRQ is defined using equation (1).

$$RSRQ = \frac{(N \cdot RSRP)}{RSSI} \qquad \text{eq. (1)}$$

RSSI is wide band power including signal power from a serving cell, co-channel neighbor cell, and interference from other cells interference and noise. RSRQ is the purity of the reference signal (RS) across the system bandwidth. RSRQ is a calculated value from RSRP and RSSI and is a measure of signal and interference. As RSRQ is a ratio of two signal powers with same unit i.e., dBm so RSRQ uses dB as a measurement unit. The best value of RSRP is about −3 dB and worst value can be −19.5 dB.

In some embodiments, IISC module 120 geo bins collected data. As the data collection occurs, IISC module 120 performs a binning operation on the collected data. In some embodiments, IISC module 120 obtains the mean of the values in a predetermined region, such as in a 50 meter by 50-meter grid. In some embodiments, IISC module 120 determines the edges (e.g., NW, SW, NE & SE) of a geographic area, divides the geographic area into 50×50-meter grids, looks up values within each grid, computes an average (mean), and attributes the mean to the latitude and longitude at the center of the grid.

In some embodiments, IISC module 120 creates a report prioritizing buildings for deployment of internal building solutions such as Wi-Fi solutions, LTE small cell solutions, and/or FTTx solutions. In some embodiments, the IISC Report is a comprehensive report that summarizes factors that influence the prioritization of the buildings for indoor solution deployment. In some embodiments, prioritization of buildings in priority levels (e.g., P1, P2, P3, and P4) is based on coverage and capacity checks.

Figure 2:
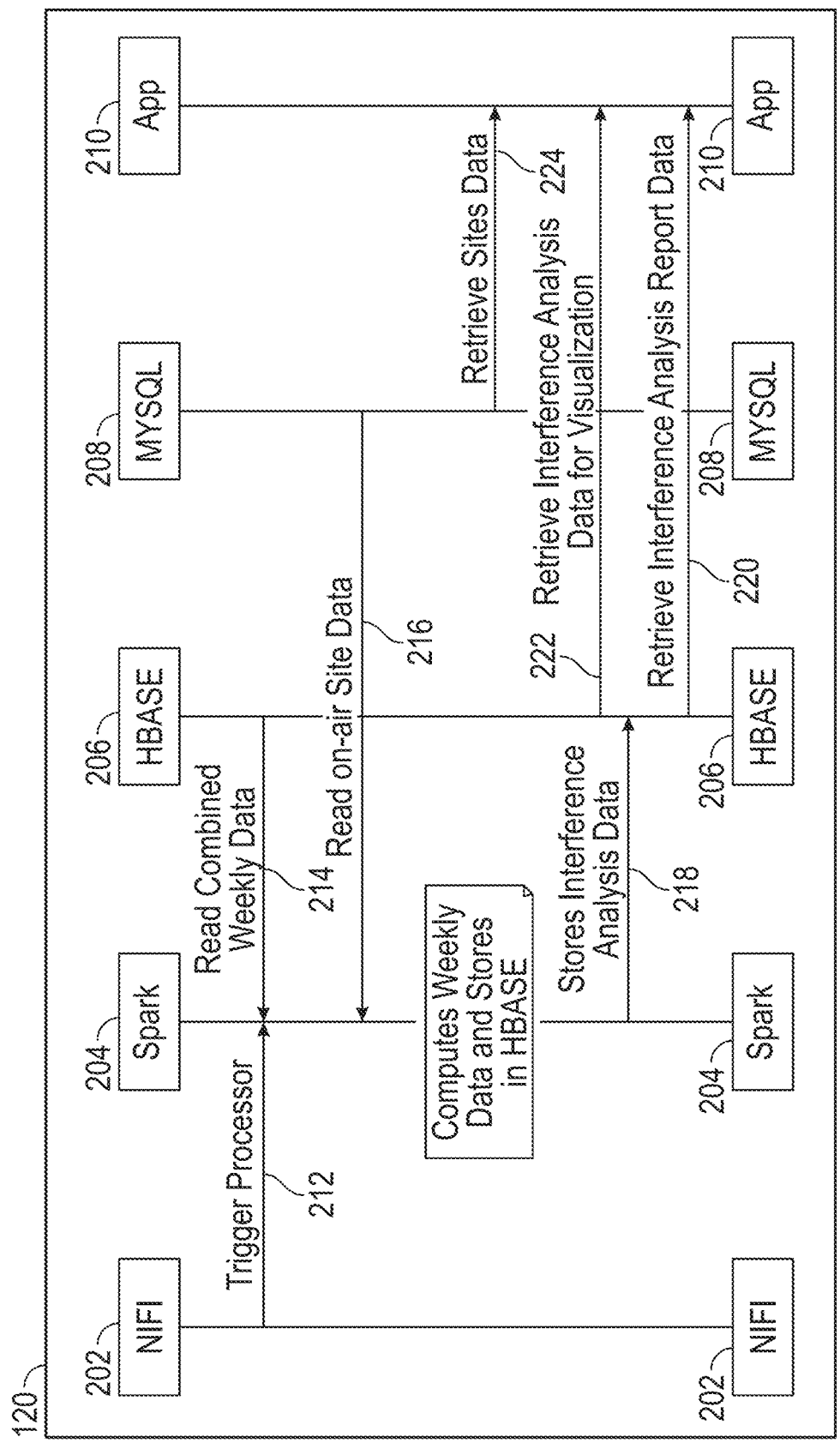
FIG. 2 is a data flow diagram of a IISC module, in accordance with some embodiments.

FIG. 2 is a data flow diagram of a IISC module 120, in accordance with some embodiments.

IISC module 120 includes a NIFI component 202, a Spark component 204, an Hbase-component 206, a MySQL component 208, and an Application component 210.

In some embodiments, NIFI-component 202 automates the flow of data between IISC module 120 and KPI servers 118. NIFI-component 202 ingests data from third party applications, the data including latitude and longitude for each base station, such as base station 108, frequency band details, eNB ID, E-UTRAN global identifier (ECGI), drive test data, KPIs, and other suitable data in accordance with some embodiments. In some embodiments, NIFI-component 202 is an open-source platform based on the concept of extract, transform, and load. The software design is based on the flow-based programming model and offers features that include the ability to operate within clusters, security using transport layer security (TLS) encryption, extensibility (e.g., users write their own software to extend abilities) and improved usability features like a portal which is used to view and modify behavior visually. NIFI-component 202 is used to schedule jobs, trigger flow, and ingest data from third-party applications like raw files from KPI servers 118.

Spark-component 204 is an open-source unified analytics engine for large-scale data processing. Spark-component 204 provides an interface for programming entire server clusters with implicit data parallelism and fault tolerance. Spark-component 204 is a parallel processing framework for running large-scale data analytics applications across clustered computers. Spark-component 204 handles both batch and real-time analytics and data processing workloads.

Hbase-component 206 provides a fault-tolerant way of storing enormous quantities of sparse data (e.g., small amounts of information caught within a large collection of empty or unimportant data). Hbase-component 206 is a column-oriented non-relational database management system that runs on top of a Hadoop Distributed File System (HDFS). HBase provides a fault-tolerant way of storing sparse data sets, which are common in many big data use cases.

HDFS-component (not shown) is a distributed filesystem that stores data on commodity machines, providing high aggregate bandwidth across server clusters. All batched data sources are initially stored into HDFS-component and then processed using Spark-component 204. Hbase-component 206 further utilizes HDFS as its data storage infrastructure.

MySQL-component 208 is an open-source relational database management system (RDBMS). A relational database organizes data into one or more data tables in which data types are related to each other and these relations help structure the data. MySQL component 208 creates, modifies, and extracts data from Spark-component 204 at operation 216, as well as controls user access. MySQL-component 208 is utilized for application programming interface (API) retrieval and for serving any real-time user interface (UI), such as UI 622 (FIG. 6). The aggregated and correlated data is further stored in MySQL.

Application component 210 allows a user, through a UI such as UI 622 of FIG. 6, to visualize network coverage at operation 222. A user visualizes varying aspects of the IISC 100 in real time at operation 220. In some embodiments, a user visualizes network coverage over specified bands and varying geographic areas. In some embodiments, a user visualizes individual grids (e.g., 50-meter×50-meter geographic areas) based on a network coverage analysis.

In some embodiments, a user drills down into details within the grid. In some embodiments, a user hovers over or clicks on a grid and a pop-up box reveals information such as cell ID, cell RSRP, cell median RSRP, cell RSRQ, and the number of cells within the grid.

At operation 212, spark component 204 retrieves third party data from NIFI component 202. In some embodiments, the inputted third-party data includes site information from a site database, such as a latitude and longitude of all cells in a RAN, frequency band details, eNB ID, ECGI, and other suitable information. In some embodiments, the inputted data additionally includes geo-located data, such as RF drive testing information, UE KPI data or other passively collected data. In some embodiments, the geo-located data is collected over a continually running window of time, such as seven days. In some embodiments, the geo-located data is collected over greater than seven days and in some embodiments the geo-located data is collected over less than seven days. In some embodiments, the window of time for collection of geo-located data is controlled by a sliding window algorithm. In some embodiments, the collected data is collected in a FIFO (first in, first out) manner whereas new data is collected older data is removed (e.g., data greater than seven days old).

Spark component 204 stores the geo-located data in Hbase component 206 and retrieves the stored data at operation 214 to perform an interference analysis. At operation 218, Spark component 204 stores the interference analysis in Hbase component 206. Continuing with operation 216, MySQL 208 retrieves site information from Spark component 204 and combines the site information for Application 210. Application 210, at operation 222, retrieves the interference analysis data from Hbase component 206 for visualization. Application component 210 further retrieves interference analysis report data at operation 220 for visualization.

Figure 3:
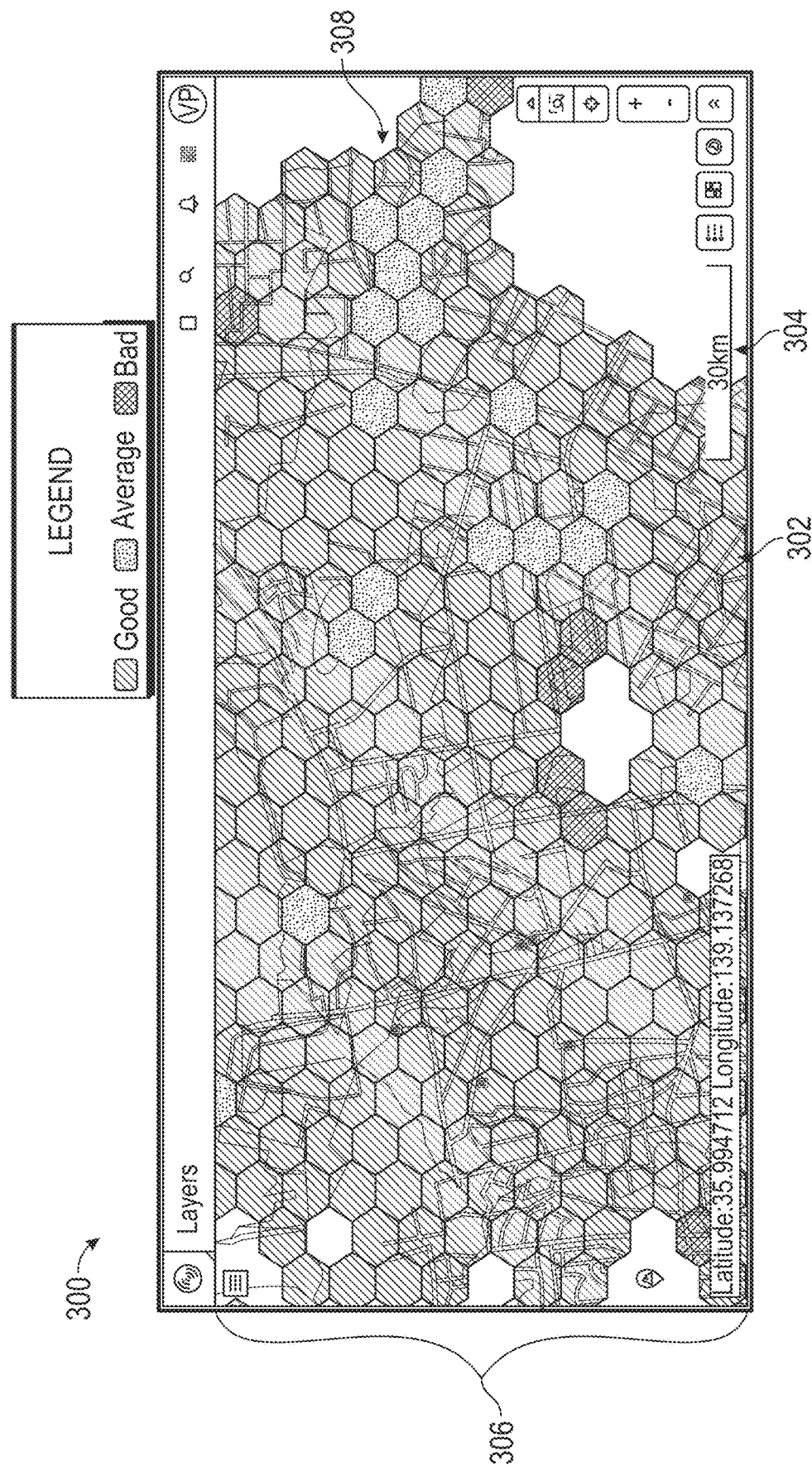
FIG. 3 is a pictorial representation of a geographic area with a hexagon pattern, in accordance with some embodiments.

FIG. 3 is a pictorial representation of a network visualization geographic area 300, in accordance with some embodiments.

Network visualization geographic area 300 is a representation of the collected data presented by the application discussed above. Network visualization geographic area 300 is divided into hexagons 302 where, in some embodiments, each hexagon 302 represents a geographic area based on scale 304 of network visualization geographic area 300. Network visualization geographic area 300, including hexagons 302, are layered over map 308, which represents a geographic area of interest. In some embodiments, the hexagons 302 combine to form a hexagon pattern 306. In some embodiments, hexagons 302 are configured with varying sizes and provide information relating to network coverage quality (e.g., as good, average, or bad). In some embodiments, the size of hexagons 302 are adjustable by an engineer or user. In some embodiments, hexagons 302 have varying shapes including circular, square (like the 50-meter× 50-meter grids), and rectangular. In some embodiments, a user selects an alternate shape of hexagons 302. In some embodiments, the area of hexagons 302 are based on a level of zoom into network visualization geographic area 300.

Figure 4:
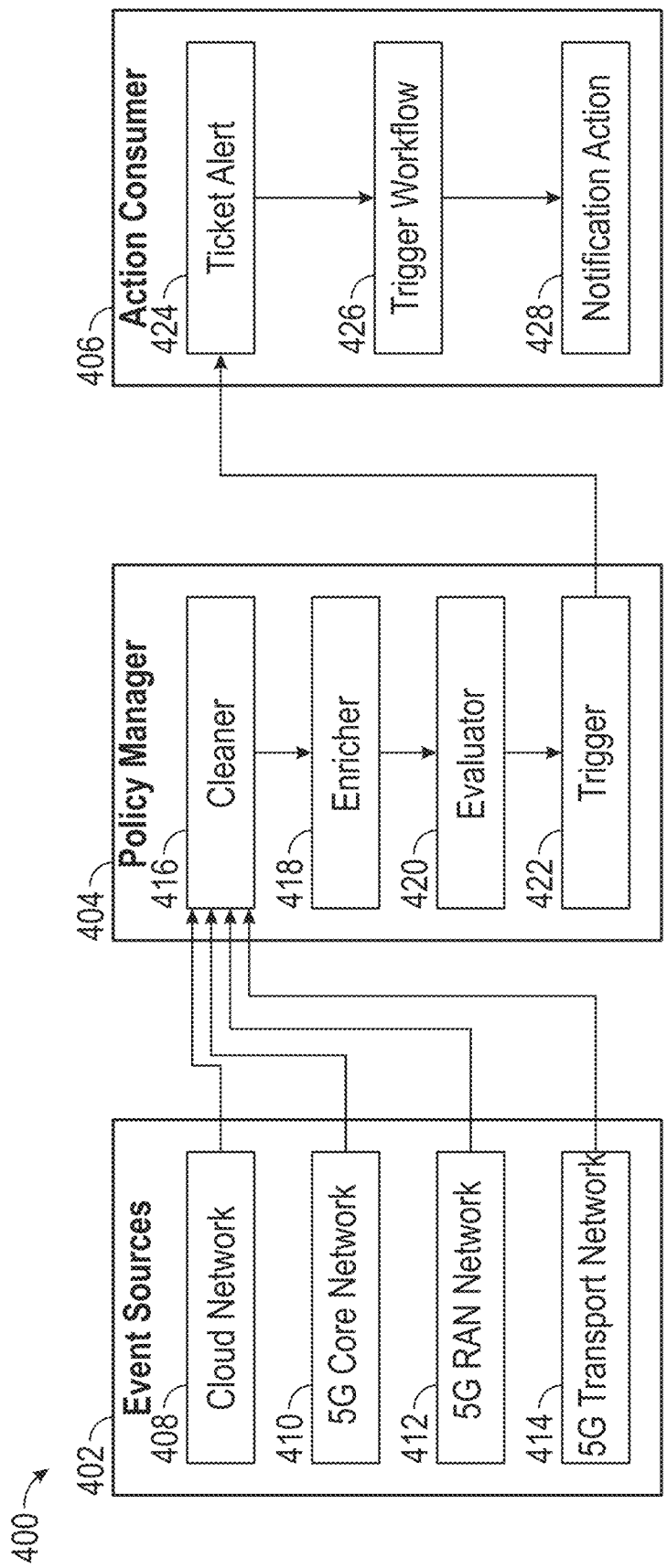
FIG. 4 is a block diagram of a correlation and policy engine (CPE), in accordance with some embodiments.

FIG. 4 is a block diagram of a correlation and policy engine (CPE) 400, in accordance with some embodiments.

CPE 400 includes an event sources input block 402, policy manager block 404, and an action consumer block 406.

Event sources input block 402 includes event emitters (agents, data sources, and other suitable event emitters within embodiments of the present disclosure). Event emitters detect, gather, and transfer event messages. An event emitter is unaware of the consumers of the event messages, the event emitter is unaware of whether an event consumer exists, and in the event the consumer exists, the event emitter is unaware how the event message is used or further processed.

Event sources 402 include events from a cloud network 408. Cloud network computing is on-demand availability of computer system resources, especially data storage (e.g., cloud storage) and computing power, without direct active management by the user. Large clouds often have functions distributed over multiple locations, each location being a data center. Event sources from cloud network 408 are events occurring in the cloud network. In a non-limiting example, one or more incidents occurring within a data center (a building, a dedicated space within a building, or a group of buildings used to house computer systems and associated components, such as telecommunications and storage systems) of cloud network 408.

Event sources 402 include events from a 5G core network (CN) 410, like CN 102. A backbone or CN 410 is a part of a computer network which interconnects networks, providing a path for the exchange of information between different local area networks (LANs) or subnetworks. A CN ties together diverse networks in the same building, in different buildings in a campus environment, or over wide areas. A large corporation that has many locations has a CN that ties the locations together, for example, in response to a server cluster needing to be accessed by different departments of a company that are located at different geographical locations. The pieces of the network connections (for example: ethernet, wireless) that bring these departments together is often referred to as the CN. One example of a CN is the Internet backbone. Event sources from 5G CN 410 are events occurring in the 5G CN. In a non-limiting example, one or more incidents occurring within a server cluster (a set of servers that work together and viewed as a single system where each node is set to perform the same task, controlled, and scheduled by software) of 5G CN 410.

Event sources 402 include events from a 5G radio access network (RAN) network 412, such as RAN 104. A RAN is part of a mobile telecommunication system. RAN implements a radio access technology. RANs reside between a device such as a mobile phone, a computer, or remotely controlled machines and provides connection with a CN, such as CN 410. Depending on the standard, mobile phones and other wireless connected devices are varyingly known as user equipment (UE), terminal equipment, mobile station (MS), or other suitable equipment within embodiments of the present disclosure. Examples of radio access network types include global system for mobile communications (GSM) radio access network, GSM RAN (GRAN), GERAN (essentially the same as GRAN but specifying the inclusion of EDGE packet radio services), universal mobile telecommunications system (UMTS) RAN, UMTS terrestrial RAN (UTRAN), and E-UTRAN (e.g., long term evolution (LTE) high speed and low latency radio access network). Event sources from 5G RAN 412 are events occurring in the 5G RAN. In a non-limiting example, one or more incidents occurring within terminal equipment and or mobile stations of 5G RAN 412.

Event sources 402 include events from 5G transport networks 414. 5G transport networks 414 include fronthaul and backhaul portions, like backhaul 106. The backhaul portion of a network includes the intermediate links between the CN, such as CN 410 and small subnetworks at the edge of a network. The most common network type in which backhaul is implemented is a mobile network. A backhaul of a mobile network, also referred to as mobile-backhaul that connects a cell site to the CN. Two methods of mobile backhaul implementations are fiber-based backhaul and wireless point-to-point backhaul. In both the technical and commercial definitions, backhaul refers to the side of the network that communicates with the global Internet. Sometimes middle mile networks exist between the customer's own LAN and those exchanges. In some embodiments, this is a local wide area network (WAN) connection.

A fronthaul network is coincident with the backhaul network, but subtly different. In a cloud RAN (C-RAN) the backhaul data is decoded from the fronthaul network at centralized controllers, from where the backhaul data is then transferred to the CN. The fronthaul portion of a C-RAN includes the intermediate links between the centralized radio controllers and the radio heads (or masts) at the edge of a cellular network. Event sources from 5G transport networks 414 are events occurring in the 5G transport networks 414. In a non-limiting example, one or more incidents occurring within radio controllers or network switches of 5G transport networks 414.

Policy Manager 404 is a real-time complex event processing (CEP) engine at scale, which automates various workflows and network healing operations. CPE 400 processes events based on policies. Based upon pre-defined policies and rules policy Manager 404 filters the events, enriches the events, correlates, and processes the events for action.

Policy Manager 404 includes cleaner 416 that accepts the events from event sources block 402, removes unwanted events, and passes the filtered events to enricher 418 for further processing. In some embodiments, these filtered events are forwarded by using a message-policy cache built by a message-policy sync process. In computing messages are passed between programs or between components of a single program. Message passing is a form of communication used in concurrent and parallel computing, object-oriented programming, and channel communication, where communication is made by sending messages to recipients. A message is sent to an object specifying a request for action.

Policy Manager 404 includes enricher 418 which enriches the messages arriving from cleaner 416 with inventory information to successfully execute a policy. In some embodiments, enricher 418 is configured with a message-enrichment cache built by an enricher sync process. In a non-limiting example, received event data is missing fields or parameters. Events are then enriched with the help of an inventory to fill the missing fields and parameters, so decisions are made, and predetermined actions occur.

Policy Manager 404 includes evaluator 420 that evaluates and processes the enriched events arriving from enricher 418. Evaluator 420 is configured to identify root causes (e.g., what is causing or initiating the received events), decide relevant actions pursuant to predetermined policies, and inform action manager 420 accordingly.

Policy Manager 404 includes trigger 422 that matches a policy with an event based the output of evaluator 420 identifying the root causes of the received events. Trigger 422 then forwards the matched policy/event to action consumer 406 to begin an action workflow.

Action consumer 406 includes ticket alert 424. Ticket alert 424 creates an incident creation or a trigger to begin a workflow action.

Action consumer 406 includes trigger workflow 426. In some embodiments, trigger workflow 426 performs actions based on a user-created policy. In some embodiments, trigger workflow 426 initiates the sending of a notification. In some embodiments, trigger workflow 426 initiates a reboot, restart, scale in, scale out, or other suitable actions within embodiments of the present disclosure.

Action consumer 406 includes a notification action 428. In some embodiments, notification action 428 is an email, text message, a report, such as the reports in Tables 1, 2, and 3 below, or graphical user interface (GUI) display on a user interface, such as user interface 622 (FIG. 6) notifying the policy creator and/or network operator an event was received, diagnosed, an action taken, and the result of the action taken (e.g., the action taken was successful or failed).

Figure 5:
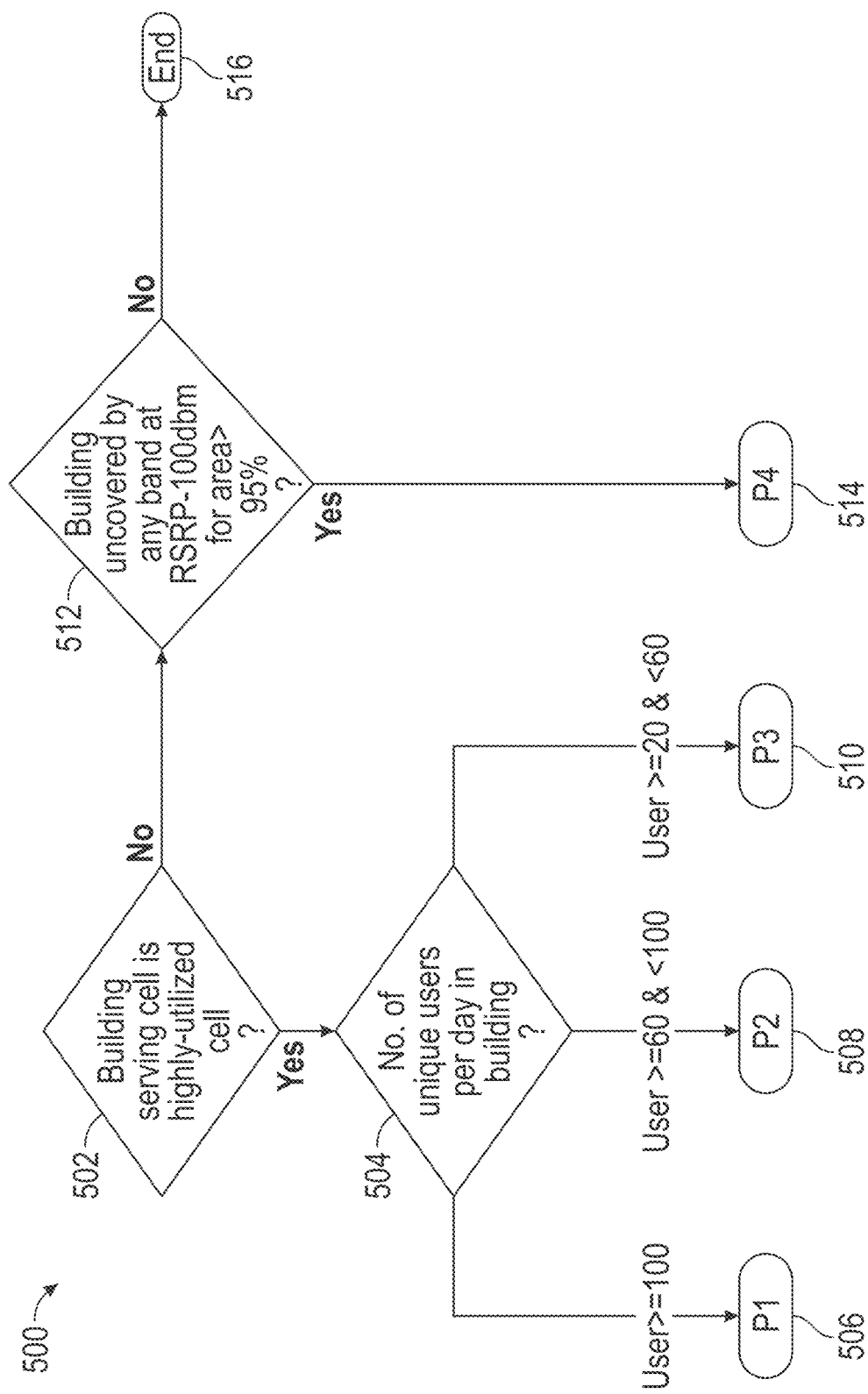
FIG. 5 is a flow diagram representation of a method for IISC, in accordance with some embodiments.

FIG. 5 is a flow diagram representation of a method for IISC 500, in accordance with some embodiments.

While the operations of method 500 are discussed and shown as having a particular order, each operation in method 500 is configured to be performed in any order unless specifically called out otherwise. Method 500 is implemented as a set of operations, such as operations 502 through 514.

At operation 502 of method 500, a capacity check is performed to determine whether one or more serving cell, currently serving a building, is a highly utilized cell for the building. In some embodiments, a highly utilized cell routinely supports greater than twenty users up to one hundred users. The determination of whether a cell is highly utilized is to prioritize the cells that are highly congested to avoid bad experiences for existing users (e.g., quality of experience QoE) and utilize other cells so that a user is able to use the network even when the network is full due to congestion.

In response to a serving cell being highly utilized by the corresponding building ("YES" branch of block 502), a determination is made as to the number of unique (e.g., separate or distinct) users served by the serving cell per day in the corresponding building. In response to greater than or equal to one hundred users ("USER≥100" branch of block 504), a priority one designation is given to the corresponding building at operation 506.

In response to less than one hundred users but greater than or equal to sixty users ("USER≥60&<100" branch of block 504), a priority two designation is given to the corresponding building at operation 508.

In response to less than sixty users but greater than or equal to twenty users ("USER≥20&<60" branch of block 504), a priority three designation is given to the corresponding building at operation 510. Priority is significant in terms of deploying solutions as each solution includes a cost. Thus, by prioritizing the high potential areas first, resources are spent on the highest priority targets.

In response to the corresponding building being uncovered by any band (e.g., 2300 MHZ, 800 MHz, or the like) at an RSRP of −100 dBm or greater for greater than 95% of the corresponding building's area ("YES" branch of block 502), a priority four designation is given to the respective building. In some embodiments, each of the priority designations are captured with Tables 1, 2, and 3 listed below as examples. In some embodiments, each report allows engineers or network operators to plan the implementation of indoor small cells to overcome the deficiencies discovered by IISC method 500. RSRP coverage depends on several factors, such as orography (i.e., mountains) and buildings, technology, radio frequency and for two-way telecommunications the sensitivity and transmit efficiency of a UE, such as UE 112. Some frequencies provide better regional coverage, while other frequencies penetrate better through obstacles, such as buildings in cities. The ability of a UE to connect to a base station depends on the strength of the signal.

In response to a building being covered by a signal band (e.g., 2300 MHz, 800 MHZ, or the like) at an RSRP of −100 dBm or better (e.g., considered a good signal) for greater than 95 percent of the building ("NO" branch of block 512), process flows from operation 512 to operation 516 where IISC method 500 is terminated.

An example IDSC building focused planning report shown in Table 1 below. With reference to Table 1, several rows address the location of the building in relation to the sales region (vendor related), the sales cluster (vendor related), network region, city, municipality, district, province, and subdivision. In some embodiments, the rows and columns of Table 1 are in varying orders depending on user preference or other suitable factors within the scope of the disclosure and are not limited by the examples of Tables 1, 2, or 3.

Several rows detail information about the building of interest including the polygon, such as one of polygons 302, where the building is located, the building polygon type (good, average, or bad coverage), the latitude and longitude of the polygon, the building height above ground level and the building height above sea level.

Several rows detail information regarding the RSRP covered area included in the building that includes a −100 dBm signal (e.g., either at 2300 MHz or at 850 MHz). In some embodiments, the RSRP coverage determination is made from network visualization polygons. In some embodiments, the RSRP coverage determination is made from smaller grids created from the network visualization polygons. In some embodiments, an average RSRP is determined for multiple bands. In some embodiments, a serving cell ID is determined. In some embodiments, a serving cell name is determined. In some embodiments, highly utilized cells are listed. In some embodiments, the number of unique users utilizing a highly utilized cell is listed. A priority number determined from method 500 is listed.

A root cause analysis (RCA) is detailed based on the priority determined in IISC method 500. Root cause analysis (RCA) is a method of problem solving used for identifying the root causes of faults or problems. In some embodiments, the RCA is broken into four steps. (1) identify and describe the problem clearly. (2) establish a timeline from the normal situation until the problem occurs. (3) distinguish between the root cause and other causal factors (e.g., using event correlation). (4) establish a causal relationship between the root cause and the problem.

Table 1 pulls from a database, such as memory 805 (FIG. 6), to determine whether there is a planned macro site soon to be implemented within 150 meters of the building. The report further informs a network engineer whether there is more than one planned macro site being developed and the site IDs of the planned sites. The table further provides information on planned outdoor small cell sites within 50 meters of the building, the number of planned small cell sites, and the IDs of the planned small cell sites. In some embodiments, in response to one or more macro sites in planning within 150 meters of the building or one or more small cell sites planned within 50 meters of the building, there is no need to implement IDSCs or a short term need for IDSCs.

The report of Table 1 further informs a network engineer whether there are indoor small cells included in the building and any planned small cells for the building along with the IDs of the planned small cells. In some embodiments, this information assists network engineers in developing good coverage for building that may currently have RSRP issues.

TABLE 1

| IDSC Building Focused Planning Report | | |
|---|---|---|
| Field | Business Rule | Remark |
| Sales Region | Sales Region for the corresponding building | Centroid of building is used for geography. |
| Sales Cluster | Sales Cluster for the corresponding building | |
| Network Region | Network Region for the corresponding building | |
| City | City for the corresponding building | |
| Municipality | Municipality for the corresponding building | |
| District | District for the corresponding building | |

TABLE 1-continued

IDSC Building Focused Planning Report

| Field | Business Rule | | Remark |
|---|---|---|---|
| Province | | Province for the corresponding building | |
| Subdivision | | City for the corresponding building | |
| Building Polygon ID | | Building Polygon ID | Source of column value from building KML file (is an XML notation for expressing geographic annotation and visualization within two-dimensional maps and three-dimensional Earth browsers) |
| Building Polygon Type | | Building Polygon Type | |
| Building Latitude | | Building Latitude | latitude of building centroid |
| Building Longitude | | Building Longitude | longitude of building centroid |
| Building Height AGL (above ground level in meters (m)) | | Building Height AGL (m) | Source of column value from building kml file |
| Building Height AMSL (above mean sea level in meters (m)) | | Building Height AMSL (m) | |
| Covered area % (≥−100 dBm) | 2300 MHz | Covered area % ≥−100 dBm using 2300 Mhz on-air SNC (secure network communications) | Latest available SNC data is used for column value |
| | 850 MHz | Covered area % ≥−100 dBm using 850 Mhz on-air SNC | |
| Avg. RSRP (dBm) | 2300 MHz | Avg. RSRP using 2300 Mhz on-air SNC | |
| | 850 MHz | Avg. RSRP using 850 Mhz on-air SNC | |
| Serving Site ID (Primary cell) | 2300 MHz | Serving Site ID from 2300 MHz on-air BSP (broadband service provider) | For finding Top 3 unique serving cell, LSR (loose source routing), network visualization and BSP data is used (e.g., based on geolocated sampled and prediction data from a planning tool) Find serving site using LSR. If top three cells are unavailable in LSR data, consider network visualization and BSP data |
| | 850 MHz | Serving Site ID from 850 MHz on-air BSP | |
| Serving Cell Name | 2300 MHz | Serving Cell ID from 2300 MHz on-air BSP | |
| | 850 MHz | Serving Cell ID from 850 MHz on-air BSP | |
| Highly utilized Cells | 2300 MHz | High Serving Cell ID from 2300 MHz on-air BSP | Capacity report is used (a criteria, which is configurable, is use in the determination as to whether the respective cell is highly utilized) |
| | 850 MHz | High Serving Cell ID from 850 MHz on-air BSP | |
| Unique Users for Building (Network visualization) | | Unique users in building using Network visualization data | Network visualization latest data 1 week (Active, Passive, Drive) is used |
| Building Priority | | Calculate priority as previous logic | Refer mail: IDSC priority calculation Conditions containing building category, floors, without name and IDSC |
| RCA (root cause analysis is a method of problem solving used for identifying the root causes of faults or problems) | | Put RCA as per previous logic | based on the outcome of the priority conditions: - 1. For priority "P1", |

TABLE 1-continued

IDSC Building Focused Planning Report

| Field | Business Rule | Remark |
|---|---|---|
| | | "P2", and "P3" put RCA as "Building is being served by highly utilized cell(s)"<br>2. For priority "P4", put RCA as "Poor Indoor Coverage"<br>3. For priority "—", put RCA as "—" |
| Planned macro site within 150 m of building (Yes/No) | Any Planned Macro site within 150 m of the building polygon (Yes/No) | |
| Planned macro site count | Count of Planned macro site | |
| Planned macro-Site IDs | Planned macro-Site IDs | |
| Planned outdoor small Cell within 50 m of building (Yes/No) | Any Planned outdoor small cell within 50 m of the building polygon (Yes/No) | |
| Planned outdoor small Cell count | Count of Planned outdoor small cell | |
| Planned outdoor small Cell SAP (service access point) IDs | Planned outdoor small cell IDs | |
| On-air indoor small Cell (Yes/No) | Any on-air indoor small cell within the building polygon (Yes/No) | |
| On-air indoor small Cell SAP IDs | Planned indoor small cell IDs | |

Table 2 listed below provides an example of an IDSC planning report focused on all cells.

TABLE 2

IDSC Planning Report All Cells

| | Field | | Business Logic |
|---|---|---|---|
| | Sales Region | | Sales Region for the corresponding cell |
| | Sales Cluster | | Sales Cluster for the corresponding cell |
| | Reigon | | Reigon for the corresponding cell |
| | City | | City for the corresponding cell |
| | Province | | Province for the corresponding cell |
| | District | | District for the corresponding cell |
| | Province | | Province for the corresponding cell |
| | Subdivision | | Subdivision for the corresponding cell |
| Cell Level Information | Cell Name | Site Id | Site Id of the corresponding Cell |
| | | Site Category | Macro Cell |
| | | Cell Id | Cell Id |
| | | Band | Band name (2300 MHz/1800 MHz/ 850 MHz) of the corresponding Cell |

TABLE 2-continued

| | IDSC Planning Report All Cells | | |
|---|---|---|---|
| | Field | | Business Logic |
| | Cell Level Statistics | Avg. unique users per day - Network Visualization | Average unique users per day of the corresponding Cell as per Network Visualization Data |
| | No. of Buildings being served | Total | Total No. of Buildings are being served by the corresponding cell (as per LSR) |
| Top 10 Enterprise buildings by Data Volume | Building 1 | Building Polygon Id | Building ID of the 1st buildings by network visualization unique users (high) |
| | | Building Polygon Type | Building Polygon Type of the 1st building |
| | | Lat | Latitude of the 1st building |
| | | Long | Longitude of the 1st building |
| | | Priority | Priority of the 1st building as already available in "IDSC Planning Report - Building Focused" |
| | | % Area covered >=−100 dBm | % Area covered >=−100 dBm of the 1st building. Latest SNC combined band data will be used. |
| | | Avg. unique users per day - Network Visualization | Average unique users per day of the corresponding building as per Network Visualization Data. Column value will be taken form "IDSC Planning Report - Building Focused" Report Unique Users for Building (Network Visualization) |
| | Building 2 | Building Polygon Id | Building ID of the 2nd buildings by network visualization unique users (high) |
| | | Building Polygon Type | Building Name of the 2nd building |
| | | Lat | Latitude of the 2nd building |
| | | Long | Longitude of the 2nd building |
| | | Priority | Priority of the 2nd building as already available in "IDSC Planning Report - Building Focused" |
| | | % Area covered >=−100 dBm | % Area covered >=−100 dBm of the 2nd building |
| | | Avg. unique users per day - Network | Average unique users per day of the corresponding |

TABLE 2-continued

IDSC Planning Report All Cells

| Field | | Business Logic |
|---|---|---|
| | Visualization | building as per Network Visualization Data |
| Building 3 | Building Polygon Id | Building ID of the 3rd buildings by network visualization unique users (high) |
| | Building Polygon Type | Building Name of the 3rd building |
| | Lat | Latitude of the 3rd building |
| | Long | Longitude of the 3rd building |
| | Priority | Priority of the 3rd building as already available in "IDSC Planning Report - Building Focused" |
| | % Area covered >=−100 dBm | % Area covered >=−100 dBm of the 3rd building |
| | Avg. unique users per day - Network Visualization | Average unique users per day of the corresponding building as per Network Visualization Data |
| Building 4 | Building Polygon Id | Building ID of the 4th buildings by network visualization unique users (high) |
| | Building Polygon Type | Building Name of the 4th building |
| | Lat | Latitude of the 4th building |
| | Long | Longitude of the 4th building |
| | Priority | Priority of the 4th building as already available in "IDSC Planning Report - Building Focused" |
| | % Area covered >=−100 dBm | % Area covered >=−100 dBm of the 4th building |
| | Avg. unique users per day - Network Visualization | Average unique users per day of the corresponding building as per Network Visualization Data |
| Building 5 | Building Polygon Id | Building ID of the 5th buildings by network visualization unique users (high) |
| | Building Polygon Type | Building Name of the 5th building |
| | Lat | Latitude of the 5th building |
| | Long | Longitude of the 5th building |
| | Priority | Priority of the 5th building as already available in "IDSC Planning |

TABLE 2-continued

| | IDSC Planning Report All Cells | |
|---|---|---|
| Field | | Business Logic |
| | | Report - Building Focused" |
| | % Area covered >=−100 dBm | % Area covered >=−100 dBm of the 5th building |
| | Avg. unique users per day - Network Visualization | Average unique users per day of the corresponding building as per Network Visualization Data |
| Building 6 | Building Polygon Id | Building ID of the 6th buildings by network visualization unique users (high) |
| | Building Polygon Type | Building Name of the 6th building |
| | Lat | Lattitude of the 6th building |
| | Long | Longitude of the 6th building |
| | Priority | Priority of the 6th building as already available in "IDSC Planning Report - Building Focused" |
| | % Area covered >=−100 dBm | % Area covered >=−100 dBm of the 6th building |
| | Avg. unique users per day - Network Visualization | Average unique users per day of the corresponding building as per Network Visualization Data |
| Building 7 | Building Polygon Id | Building ID of the 7th buildings by network visualization unique users (high) |
| | Building Polygon Type | Building Name of the 7th building |
| | Lat | Latitude of the 7th building |
| | Long | Longitude of the 7th building |
| | Priority | Priority of the 7th building as already available in "IDSC Planning Report - Building Focused" |
| | % Area covered >=−100 dBm | % Area covered >=−100 dBm of the 7th building |
| | Avg. unique users per day - Network Visualization | Average unique users per day of the corresponding building as per Network Visualization Data |
| Building 8 | Building Polygon Id | Building ID of the 8th buildings by network visualization unique users (high) |
| | Building Polygon Type | Building Name of the 8th building |

TABLE 2-continued

IDSC Planning Report All Cells

| Field | | Business Logic |
|---|---|---|
| | Lat | Latitude of the 8th building |
| | Long | Longitude of the 8th building |
| | Priority | Priority of the 8th building as already available in "IDSC Planning Report - Building Focused" |
| | % Area covered >=−100 dBm | % Area covered >=−100 dBm of the 8th building |
| | Avg. unique users per day - Network Visualization | Average unique users per day of the corresponding building as per Network Visualization Data |
| Building 9 | Building Polygon Id | Building ID of the 9th buildings by network visualization unique users (high) |
| | Building Polygon Type | Building Name of the 9th building |
| | Lat | Latitude of the 9th building |
| | Long | Longitude of the 9th building |
| | Priority | Priority of the 9th building as already available in "IDSC Planning Report - Building Focused" |
| | % Area covered >=−100 dBm | % Area covered >=−100 dBm of the 9th building |
| | Avg. unique users per day - Network Visualization | Average unique users per day of the corresponding building as per Network Visualization Data |
| Building 10 | Building Polygon Id | Building ID of the 10th buildings by network visualization unique users (high) |
| | Building Polygon Type | Building Name of the 10th building |
| | Lat | Latitude of the 10th building |
| | Long | Longitude of the 10th building |
| | Priority | Priority of the 10th building as already available in "IDSC Planning Report - Building Focused" |
| | % Area covered >=−100 dBm | % Area covered >=−100 dBm of the 10th building |
| | Avg. unique users per day - Network Visualization | Average unique users per day of the corresponding building as per Network Visualization Data |

Table 3 presents an IDSC planning report focused on highly utilized cells.

| | Field | | Business Logic |
|---|---|---|---|
| | Sales Region | | Sales Region for the corresponding cell |
| | Sales Cluster | | Sales Cluster for the corresponding cell |
| | Region | | Region for the corresponding cell |
| | City | | City for the corresponding cell |
| | Province | | Province for the corresponding cell |
| | District | | District for the corresponding cell |
| | Province | | Province for the corresponding cell |
| | Subdivision | | Subdivision for the corresponding cell |
| Cell Level Information | Cell Name | Site Id | Site Id of the corresponding HU Cell |
| | | Site Category | Macro Cell |
| | | Cell Id | HU Cell Id |
| | | Band | Band name (2300 MHz/1800 MHz/ 850 MHz) of the corresponding Cell |
| | Cell Level Statistics | Avg. unique users per day - Network Visualization | Average unique users per day of the corresponding Cell as per Network Visualization Data |
| | No. of Buildings being served | Total | Total No. of Buildings are being served by the corresponding cell (as per LSR) |
| Top 10 Enterprise buildings by Data Volume | Building 1 | Building Polygon Id | Building ID of the 1st buildings by Network Visualization unique users (high) |
| | | Building Polygon Type | Building Polygon Type of the 1st building |
| | | Lat | Latitude of the 1st building |
| | | Long | Longitude of the 1st building |
| | | Priority | Priority of the 1st building as already available in "IDSC Planning Report - Building Focused" |
| | | % Area covered >=-100 dBm | % Area covered >=-100 dBm of the 1st building. Latest SNC combined band data will be used. |
| | | Avg. unique users per day - Network Visualization | Average unique users per day of the corresponding building as per Network Visualization Data. Column value will be taken form "IDSC Planning Report - Building Focused" |

-continued

| Field | | Business Logic |
|---|---|---|
| | | Report Unique Users for Building (Network Visualization) |
| Building 2 | Building Polygon Id | Building ID of the 2nd buildings by Network Visualization unique users (high) |
| | Building Polygon Type | Building Name of the 2nd building |
| | Lat | Latitude of the 2nd building |
| | Long | Longitude of the 2nd building |
| | Priority | Priority of the 2nd building as already available in "IDSC Planning Report - Building Focused" |
| | % Area covered >=−100 dBm | % Area covered >=−100 dBm of the 2nd building |
| | Avg. unique users per day - Network Visualization | Average unique users per day of the corresponding building as per Network Visualization Data |
| Building 3 | Building Polygon Id | Building ID of the 3rd buildings by Network Visualization unique users (high) |
| | Building Polygon Type | Building Name of the 3rd building |
| | Lat | Latitude of the 3rd building |
| | Long | Longitude of the 3rd building |
| | Priority | Priority of the 3rd building as already available in "IDSC Planning Report - Building Focused" |
| | % Area covered >=−100 dBm | % Area covered >=−100 dBm of the 3rd building |
| | Avg. unique users per day - Network Visualization | Average unique users per day of the corresponding building as per Network Visualization Data |
| Building 4 | Building Polygon Id | Building ID of the 4th buildings by Network Visualization unique users (high) |
| | Building Polygon Type | Building Name of the 4th building |
| | Lat | Latitude of the 4th building |
| | Long | Longitude of the 4th building |
| | Priority | Priority of the 4th building as already available in "IDSC Planning |

-continued

| Field | | Business Logic |
|---|---|---|
| | | Report - Building Focused" |
| | % Area covered >=−100 dBm | % Area covered >=−100 dBm of the 4th building |
| | Avg. unique users per day - Network Visualization | Average unique users per day of the corresponding building as per Network Visualization Data |
| Building 5 | Building Polygon Id | Building ID of the 5th buildings by Network Visualization unique users (high) |
| | Building Polygon Type | Building Name of the 5th building |
| | Lat | Latitude of the 5th building |
| | Long | Longitude of the 5th building |
| | Priority | Priority of the 5th building as already available in "IDSC Planning Report - Building Focused" |
| | % Area covered >=−100 dBm | % Area covered >=−100 dBm of the 5th building |
| | Avg. unique users per day - Network Visualization | Average unique users per day of the corresponding building as per Network Visualization Data |
| Building 6 | Building Polygon Id | Building ID of the 6th buildings by Network Visualization unique users (high) |
| | Building Polygon Type | Building Name of the 6th building |
| | Lat | Latitude of the 6th building |
| | Long | Longitude of the 6th building |
| | Priority | Priority of the 6th building as already available in "IDSC Planning Report - Building Focused" |
| | % Area covered >=−100 dBm | % Area covered >=−100 dBm of the 6th building |
| | Avg. unique users per day - Network Visualization | Average unique users per day of the corresponding building as per Network Visualization Data |
| Building 7 | Building Polygon Id | Building ID of the 7th buildings by Network Visualization unique users (high) |
| | Building Polygon Type | Building Name of the 7th building |

-continued

| Field | | Business Logic |
|---|---|---|
| | Lat | Latitude of the 7th building |
| | Long | Longitude of the 7th building |
| | Priority | Priority of the 7th building as already available in "IDSC Planning Report - Building Focused" |
| | % Area covered >=−100 dBm | % Area covered >=−100 dBm of the 7th building |
| | Avg. unique users per day - Network Visualization | Average unique users per day of the corresponding building as per Network Visualization Data |
| Building 8 | Building Polygon ID | Building ID of the 8th buildings by Network Visualization unique users (high) |
| | Building Polygon Type | Building Name of the 8th building |
| | Lat | Latitude of the 8th building |
| | Long | Longitude of the 8th building |
| | Priority | Priority of the 8th building as already available in "IDSC Planning Report - Building Focused" |
| | % Area covered >=−100 dBm | % Area covered >=−100 dBm of the 8th building |
| | Avg. unique users per day - Network Visualization | Average unique users per day of the corresponding building as per Network Visualization Data |
| Building 9 | Building Polygon Id | Building ID of the 9th buildings by Network Visualization unique users (high) |
| | Building Polygon Type | Building Name of the 9th building |
| | Lat | Latitude of the 9th building |
| | Long | Longitude of the 9th building |
| | Priority | Priority of the 9th building as already available in "IDSC Planning Report - Building Focused" |
| | % Area covered >=−100 dBm | % Area covered >=−100 dBm of the 9th building |
| | Avg. unique users per day - Network Visualization | Average unique users per day of the corresponding building as per Network Visualization Data |
| Building 10 | Building Polygon Id | Building ID of the 10th buildings by |

-continued

| Field | Business Logic |
|---|---|
| | Network Visualization unique users (high) |
| Building Polygon Type | Building Name of the 10th building |
| Lat | Latitude of the 10th building |
| Long | Longitude of the 10th building |
| Priority | Priority of the 10th building as already available in "IDSC Planning Report - Building Focused" |
| % Area covered >=−100 dBm | % Area covered >=−100 dBm of the 10th building |
| Avg. unique users per day - Network Visualization | Average unique users per day of the corresponding building as per Network Visualization Data |

FIG. 6 is a block diagram of an identification of internal building locations for indoor small cells (IISC) processing circuitry 600 in accordance with some embodiments. In some embodiments, IISC processing circuitry 600 is a general-purpose computing device including a hardware processor 602 and a non-transitory, computer-readable storage medium 604. Storage medium 604, amongst other things, is encoded with, i.e., stores, computer program code 606, i.e., a set of executable instructions such as IISC algorithm, such as method 500. Execution of instructions 606 by hardware processor 602 represents (at least in part) an identification of internal building locations for indoor small cells application which implements a portion, or all the methods described herein in accordance with one or more embodiments (hereinafter, the noted processes and/or methods).

Processor 602 is electrically coupled to a computer-readable storage medium 604 via a bus 608. Processor 602 is further electrically coupled to an I/O interface 610 by bus 608. A network interface 612 is further electrically connected to processor 602 via bus 608. Network interface 612 is connected to a network 614, so that processor 602 and computer-readable storage medium 604 connect to external elements via network 614. Processor 602 is configured to execute computer program code 606 encoded in computer-readable storage medium 604 to cause IISC processing circuitry 600 to be usable for performing a portion or all the noted processes and/or methods. In one or more embodiments, processor 602 is a central processing unit (CPU), a multi-processor, a distributed processing system, an application specific integrated circuit (ASIC), and/or a suitable processing unit.

In one or more embodiments, computer-readable storage medium 604 is an electronic, magnetic, optical, electromagnetic, infrared, and/or a semiconductor system (or apparatus or device). For example, computer-readable storage medium 604 includes a semiconductor or solid-state memory, a magnetic tape, a removable computer diskette, a random-access memory (RAM), a read-only memory (ROM), a rigid magnetic disk, and/or an optical disk. In one or more embodiments using optical disks, computer-readable storage medium 604 includes a compact disk-read only memory (CD-ROM), a compact disk-read/write (CD-R/W), and/or a digital video disc (DVD).

In one or more embodiments, storage medium 604 stores computer program code 606 configured to cause IISC processing circuitry 600 to be usable for performing a portion or all the noted processes and/or methods. In one or more embodiments, storage medium 604 further stores information, such as IISC algorithm which facilitates performing a portion or all the noted processes and/or methods.

IISC processing circuitry 600 includes I/O interface 610. I/O interface 610 is coupled to external circuitry. In one or more embodiments, I/O interface 610 includes a keyboard, keypad, mouse, trackball, trackpad, touchscreen, and/or cursor direction keys for communicating information and commands to processor 602.

IISC processing circuitry 600 further includes network interface 612 coupled to processor 602. Network interface 612 allows IISC processing circuitry 600 to communicate with network 614, to which one or more other computer systems are connected. Network interface 612 includes wireless network interfaces such as BLUETOOTH, WIFI, WIMAX, GPRS, or WCDMA; or wired network interfaces such as ETHERNET, USB, or IEEE-864. In one or more embodiments, a portion or all noted processes and/or methods, is implemented in two or more IISC processing circuitry 600.

IISC processing circuitry 600 is configured to receive information through I/O interface 610. The information received through I/O interface 610 includes one or more of instructions, data, design rules, libraries of standard cells, and/or other parameters for processing by processor 602. The information is transferred to processor 602 via bus 608. IISC processing circuitry 600 is configured to receive information related to UI 622 through I/O interface 610. The information is stored in computer-readable medium 604 as user interface (UI) 622.

In some embodiments, a portion or all the noted processes and/or methods is implemented as a standalone software application for execution by a processor. In some embodiments, a portion or all the noted processes and/or methods is implemented as a software application that is a part of an additional software application. In some embodiments, a portion or all the noted processes and/or methods is implemented as a plug-in to a software application.

In some embodiments, the processes are realized as functions of a program stored in a non-transitory computer readable recording medium. Examples of a non-transitory computer-readable recording medium include, but are not limited to, external/removable and/or internal/built-in storage or memory unit, e.g., one or more of an optical disk, such as a DVD, a magnetic disk, such as a hard disk, a semiconductor memory, such as a ROM, a RAM, a memory card, and the like.

In some embodiments, a method includes determining whether a network serving cell serving a building is highly utilized; and determining an amount of users of the network serving cell that are included in the building per twenty-four-hour period.

In some embodiments, the method further includes in response to the amount of users of the network serving cell that are included in the building per twenty-four-hour period being greater than one hundred, identifying the building as a priority one building.

In some embodiments, the method further includes in response to the amount of users of the network serving cell that are included in the building per the twenty-four-hour period being equal to or greater than sixty but less than one hundred, identifying the building as a priority two building.

In some embodiments, the method further includes in response to the amount of users of the network serving cell that are included in the building per the twenty-four-hour period being equal to or greater than twenty but less than sixty, identifying the building as a priority three building.

In some embodiments, the method further includes in response to the network serving cell serving the building not being highly utilized, determining whether the building is uncovered by a signal band with a reference signal received power (RSRP) of equal to or greater than −100 dBm for greater than 95% of the building.

In some embodiments, the method further includes in response to determining the building is uncovered by the signal band with an RSRP of equal to or greater than −100 dBm for greater than 95% of the building, identifying the building as a priority four building.

In some embodiments, the method further includes in response to determining the building is covered by the signal band with an RSRP of equal to or greater than −100 dBm for greater than 95% of the building, identifying the building as covered by the RSRP of equal to or greater than −100 dBm for greater than 95% of the building.

In some embodiments, the method further includes in response to identifying the building as the priority four building, identifying planned macro sites within 150 meters of the building; and prioritizing development of an identified planned macro site within 150 meters of the building.

In some embodiments, the method further includes in response to identifying the building as the priority four building, identifying planned outdoor small cell sites within 50 meters of the building; and prioritizing development of an identified planned small cell site within 50 meters of the building.

In some embodiments, the method further includes in response to being unable to identify a planned macro cell within 150 meters or a planned small cell within 50 meters of the building, prioritizing development of one or more indoor small cell sites.

In some embodiments, an apparatus includes a processor; and a memory having instructions stored thereon that, when executed by the processor, cause the apparatus to determine whether a network serving cell serving a building is highly utilized; and determine an amount of users of the network serving cell that are included in the building per twenty-four-hour period.

In some embodiments, the apparatus further includes in response to the amount of users of the network serving cell that are included in the building per twenty-four-hour period being greater than one hundred, identify the building as a priority one building.

In some embodiments, the apparatus further including in response to the amount of users of the network serving cell that are included in the building per twenty-four-hour period being equal to or greater than sixty but less than one hundred, identify the building as a priority two building.

In some embodiments, the apparatus further includes in response to the amount of users of the network serving cell that are included in the building per twenty-four-hour period being equal to or greater than twenty but less than sixty, identify the building as a priority three building.

In some embodiments, the apparatus further includes in response to the network serving cell serving the building not being highly utilized, determining whether the building is uncovered by a signal band with a reference signal received power (RSRP) of equal to or greater than a first threshold for greater than a second threshold of the building.

In some embodiments, a non-transitory computer readable medium having instructions stored thereon that, when executed by a processor, cause an apparatus to determine whether a network serving cell serving a building is highly utilized; determine an amount of users of the network serving cell that are included in the building per twenty-four-hour period; in response to the amount of users of the network serving cell that are included in the building per twenty-four-hour period being greater than one hundred, identify the building as a priority one building; in response to the amount of users of the network serving cell that are included in the building per the twenty-four-hour period being equal to or greater than sixty but less than one hundred, identify the building as a priority two building; in response to the amount of users of the network serving cell that are included in the building per the twenty-four-hour period being equal to or greater than twenty but less than sixty, identify the building as a priority three building; and in response to the network serving cell serving the building not being highly utilized, determining whether the building is uncovered by a signal band with a reference signal received power (RSRP) of equal to or greater than a first threshold for greater than a second threshold of the building.

In some embodiments, the non-transitory computer readable medium further includes in response to determining the building is uncovered by the signal band with an RSRP of equal to or greater than the first threshold for greater than the second threshold of the building, identifying the building as a priority four building.

In some embodiments, the non-transitory computer readable medium further includes in response to determining the building is covered by the signal band with an RSRP of equal to or greater than the first threshold for greater than the second threshold of the building, identifying the building as covered by the RSRP of equal to or greater than the first threshold for greater than the second threshold of the building.

In some embodiments, the non-transitory computer readable medium further includes in response to identifying the building as the priority four building, identify planned macro sites within a third threshold of the building; and prioritize development of an identified planned macro site within the third threshold of the building.

In some embodiments, the non-transitory computer readable medium further includes in response to identifying the building as the priority four building, identify planned outdoor small cell sites within a fourth threshold of the building, where the fourth threshold is smaller than the third threshold; prioritize development of an identified planned small cell site within 50 meters of the building; and in response to being unable to identify a planned macro cell within the third threshold or a planned small cell within the fourth threshold of the building, prioritize development of one or more indoor small cell sites.

The foregoing outlines features of several embodiments so that those skilled in the art better understand the aspects of the present disclosure. Those skilled in the art should appreciate that they readily use the present disclosure as a basis for designing or modifying other processes and structures for conducting the same purposes and/or achieving the same advantages of the embodiments introduced herein. Those skilled in the art should further realize that such equivalent constructions do not depart from the spirit and scope of the present disclosure, and that they make various changes, substitutions, and alterations herein without departing from the spirit and scope of the present disclosure.

What is claimed is:

1. A method comprising:
   determining whether a network serving cell serving a building is highly utilized, wherein a building is determined to be highly utilized in response to a number of users being greater than a threshold value;
   determining an amount of users of the network serving cell that are included in the building per twenty-four-hour period; and
   in response to the network serving cell serving the building not being highly utilized, determining whether the building is uncovered by a signal band with a reference signal received power (RSRP) of equal to or greater than −100 dBm for greater than 95% of the building.

2. The method of claim 1, further comprising:
   in response to the amount of users of the network serving cell that are included in the building per twenty-four-hour period being greater than one hundred, identifying the building as a priority one building.

3. The method of claim 1, further comprising:
   in response to the amount of users of the network serving cell that are included in the building per the twenty-four-hour period being equal to or greater than sixty but less than one hundred, identifying the building as a priority two building.

4. The method of claim 1, further comprising:
   in response to the amount of users of the network serving cell that are included in the building per the twenty-four-hour period being equal to or greater than twenty but less than sixty, identifying the building as a priority three building.

5. The method of claim 1, further comprising:
   prioritize, based on a priority level of the building, development of an identified planned macro site within a first distance from the building, an identified planned small site within a second distance from the building, or an indoor small cell with in the building.

6. The method of claim 5, further comprising:
   in response to determining the building is uncovered by the signal band with an RSRP of equal to or greater than −100 dBm for greater than 95% of the building, identifying the building as a priority four building.

7. The method of claim 5, further comprising:
   in response to determining the building is covered by the signal band with an RSRP of equal to or greater than −100 dBm for greater than 95% of the building, identifying the building as covered by the RSRP of equal to or greater than −100 dBm for greater than 95% of the building.

8. The method of claim 6, further comprising:
   in response to identifying the building as the priority four building, identifying planned macro sites within the first distance of the building, wherein the first distance is 150meters; and
   prioritizing development of an identified planned macro site within 150 meters of the building.

9. The method of claim 6, further comprising:
   in response to identifying the building as the priority four building, identifying planned outdoor small cell sites within the second distance of the building, wherein the second distance is 50 meters; and
   prioritizing development of an identified planned small cell site within 50 meters of the building.

10. The method of claim 6, further comprising:
    in response to being unable to identify a planned macro cell within 150 meters or a planned small cell within the second distance of the building, prioritizing development of one or more indoor small cell sites, and the second distance is 50 meters.

11. An apparatus, comprising:
    a processor; and
    a memory having instructions stored thereon that, when executed by the processor, cause the apparatus to:
      determine whether a network serving cell serving a building is highly utilized, wherein a building is determined to be highly utilized in response to a number of users being greater than a threshold value; and
      determine an amount of users of the network serving cell that are included in the building per twenty-four-hour period; and
      prioritize, based on a priority level of the building, development of an identified planned macro site within a first distance from the building, an identified planned small site within a second distance from the building, or an indoor small cell within the building.

12. The apparatus of claim 11, further comprising:
    in response to the amount of users of the network serving cell that are included in the building per twenty-four-hour period being greater than one hundred, identify the building as a priority one building.

13. The apparatus of claim 11, further comprising:
    in response to the amount of users of the network serving cell that are included in the building per twenty-four-hour period being equal to or greater than sixty but less than one hundred, identify the building as a priority two building.

14. The apparatus of claim 11, further comprising:
    in response to the amount of users of the network serving cell that are included in the building per twenty-fourhour period being equal to or greater than twenty but less than sixty, identify the building as a priority three building.

15. The apparatus of claim 11, further comprising:
in response to the network serving cell serving the building not being highly utilized, determining whether the building is uncovered by a signal band with a reference signal received power (RSRP) of equal to or greater than a first threshold for greater than a second threshold of the building.

16. A non-transitory computer readable medium having instructions stored thereon that, when executed by a processor, cause an apparatus to:
determine whether a network serving cell serving a building is highly utilized, wherein a building is determined to be highly utilized in response to a number of users being greater than a threshold value;
determine an amount of users of the network serving cell that are included in the building per twenty-four-hour period;
in response to the amount of users of the network serving cell that are included in the building per twenty-four-hour period being greater than one hundred, identify the building as a priority one building;
in response to the amount of users of the network serving cell that are included in the building per the twenty-four-hour period being equal to or greater than sixty but less than one hundred, identify the building as a priority two building;
in response to the amount of users of the network serving cell that are included in the building per the twenty-four-hour period being equal to or greater than twenty but less than sixty, identify the building as a priority three building;
in response to the network serving cell serving the building not being highly utilized, determining whether the building is uncovered by a signal band with a reference signal received power (RSRP) of equal to or greater than a first threshold for greater than a second threshold of the building; and
prioritize, based on a priority level of the building, development of an identified planned macro site within a first distance from the building or an identified planned small site within a second distance from the building.

17. The non-transitory computer readable medium of claim 16, further comprising:
in response to determining the building is uncovered by the signal band with an RSRP of equal to or greater than the first threshold for greater than the second threshold of the building, identifying the building as a priority four building.

18. The non-transitory computer readable medium of claim 16, further comprising:
in response to determining the building is covered by the signal band with an RSRP of equal to or greater than the first threshold for greater than the second threshold of the building, identifying the building as covered by the RSRP of equal to or greater than the first threshold for greater than the second threshold of the building.

19. The non-transitory computer readable medium of claim 17, further comprising:
in response to identifying the building as the priority four building, identify planned macro sites within a third threshold of the building, wherein the third threshold is the first distance; and
prioritize development of an identified planned macro site within the third threshold of the building.

20. The non-transitory computer readable medium of claim 19, further comprising:
in response to identifying the building as the priority four building, identify planned outdoor small cell sites within a fourth threshold of the building, wherein the fourth threshold is the second distance, and the fourth threshold is smaller than the third threshold;
prioritize development of an identified planned small cell site within the fourth threshold of the building; and
in response to being unable to identify a planned macro cell within the third threshold or a planned small cell within the fourth threshold of the building, prioritize development of one or more indoor small cell sites.

* * * * *